(12) United States Patent
Chen et al.

(10) Patent No.: US 12,467,947 B2
(45) Date of Patent: Nov. 11, 2025

(54) LOW FRICTION HORIZONTAL PROBING FIXTURE

(71) Applicants: Kuan-Hung Chen, Taichung (TW); Li-Cheng Richard Zai, Los Gatos, CA (US)

(72) Inventors: Kuan-Hung Chen, Taichung (TW); Li-Cheng Richard Zai, Los Gatos, CA (US)

( * ) Notice: Subject to any disclaimer, the term of this patent is extended or adjusted under 35 U.S.C. 154(b) by 147 days.

(21) Appl. No.: 18/503,989

(22) Filed: Nov. 7, 2023

(65) Prior Publication Data

US 2025/0147068 A1   May 8, 2025

(51) Int. Cl.
G01R 1/067 (2006.01)
G01R 1/04 (2006.01)

(52) U.S. Cl.
CPC ............ *G01R 1/06705* (2013.01); *G01R 1/04* (2013.01)

(58) Field of Classification Search
CPC ............ G01R 31/2808; G01R 1/06705; G01R 31/2887; G01R 1/0483; G01R 1/07314; G01R 31/2886; G01R 1/07307

USPC ............ 324/750.22, 750.16, 754.09, 756.01, 324/756.07
See application file for complete search history.

(56) References Cited

U.S. PATENT DOCUMENTS

| | | | | |
|---|---|---|---|---|
| 4,103,232 A * | 7/1978 | Sugita | ............... | H01L 21/68707 414/788.9 |
| 6,036,367 A * | 3/2000 | Takeda | .................... | F16C 29/10 384/45 |
| 6,667,630 B2 * | 12/2003 | Abdulky | ............ | G01R 31/2808 324/763.01 |
| 11,150,293 B1 * | 10/2021 | Chen | ..................... | H05K 1/0268 |
| 2024/0052969 A1 * | 2/2024 | You | ......................... | F16M 11/10 |

* cited by examiner

*Primary Examiner* — Roberto Velez
(74) *Attorney, Agent, or Firm* — Osha Bergman Watanabe & Burton LLP

(57) ABSTRACT

A low friction horizontal probing fixture includes two rails of a base unit and two slide units respectively disposed on and being slidable along the rails. Each slide unit has a slide seat that is disposed adjacent to a respective one of the rails, rolling members that are connected to the slide seat and that are rollable on the respective rail so that the slide seat is movable along the respective rail, and a lock mechanism that is disposed on the slide seat and that is operable to position the slide seat relative to the respective rail. A guiding member is connected co-movably to the slide units.

20 Claims, 19 Drawing Sheets

LOW FRICTION HORIZONTAL PROBING FIXTURE

FIELD

The disclosure relates to a probing fixture, and more particularly to a low friction horizontal probing fixture.

BACKGROUND

Referring to FIG. 1, a horizontal probe fixture as disclosed in U.S. Pat. No. 11,150,293B1 includes two spaced-apart slide rails 11 that are parallel with each other, two slide blocks 12 that are respectively slidable along the slide rails 11 in a front-rear direction, a transverse plate 13 that is co-movably connected to the slide blocks 12, and a slide table 14 that is slidable along the transverse plate 13 in a right-left direction. Because the slide table 14 is slidable along the transverse plate 13 in the left-right direction, and because the transverse plate 13 moves together with the slide blocks 12 to slide along the slide rails 11 in the front-rear direction, the slide table 14 is movable relative to the slide rails 11 in the front-rear direction and the left-right direction.

As long as the slide table 14 is mounted with a probe holder (not shown) and a microscope holder (not shown), the probe holder (not shown) and the microscope holder (not shown) are movable in the front-rear direction and the left-rear direction to electrically probe a printed circuit board (not shown).

However, because the slide blocks 12 are respectively in surface contact with the slide rails 11, movement of the slide blocks 12 respectively along the slide rails 11 may result in frictional resistance that may cause unsmooth movement of the slide blocks 12. Furthermore, only one side of the printed circuit board may be probed by the horizontal probe fixture. To probe another side of the circuit board is inconvenient because the circuit board has to be turned over and fixed.

SUMMARY

Therefore, an object of the disclosure is to provide a low friction horizontal probing fixture that can alleviate at least one of the drawbacks of the prior art.

According to the disclosure, a low friction horizontal probing fixture is adapted for cooperating with a probe unit to measure a test workpiece. The low friction horizontal probing fixture of the disclosure includes a base unit, two slide units, and a carrier unit.

The base unit has two rails that are elongated in a first direction.

The slide units are respectively disposed on and are slidable along the rails. Each of the slide units has a slide seat that is disposed adjacent to a respective one of the rails, a plurality of rolling members that are rotatably connected to the slide seat and that are rollable on the respective one of the rails so that the slide seat is movable along the respective one of the rails, and a lock mechanism that is disposed on the slide seat and that is operable to position the slide seat relative to the respective one of the rails.

The carrier unit is adapted to be mounted with the probe unit, and is connected co-movably to the slide units. The carrier unit has a guiding member that is elongated in a second direction perpendicular to the first direction and that interconnects the slide units.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
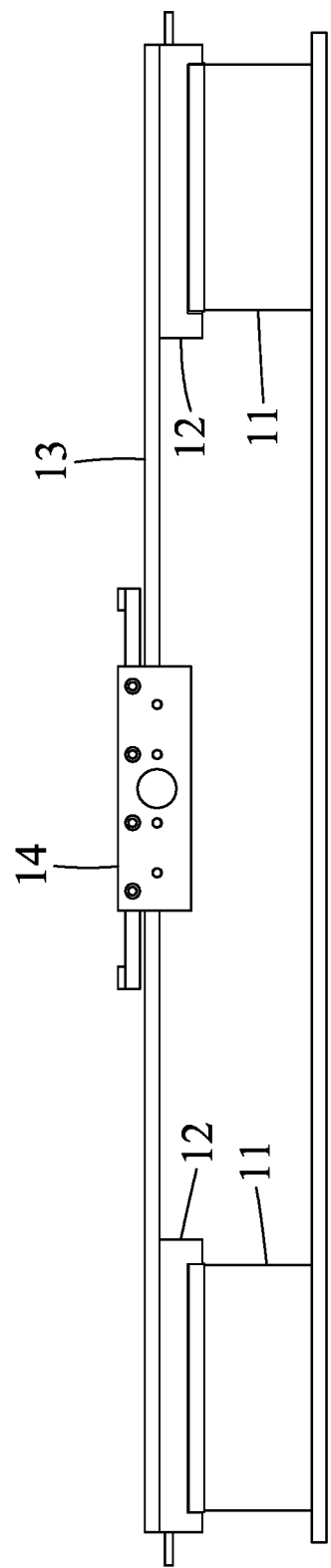
FIG. 1 illustrate a horizontal probe fixture as disclosed in U.S. Pat. No. 11,150,293B1.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
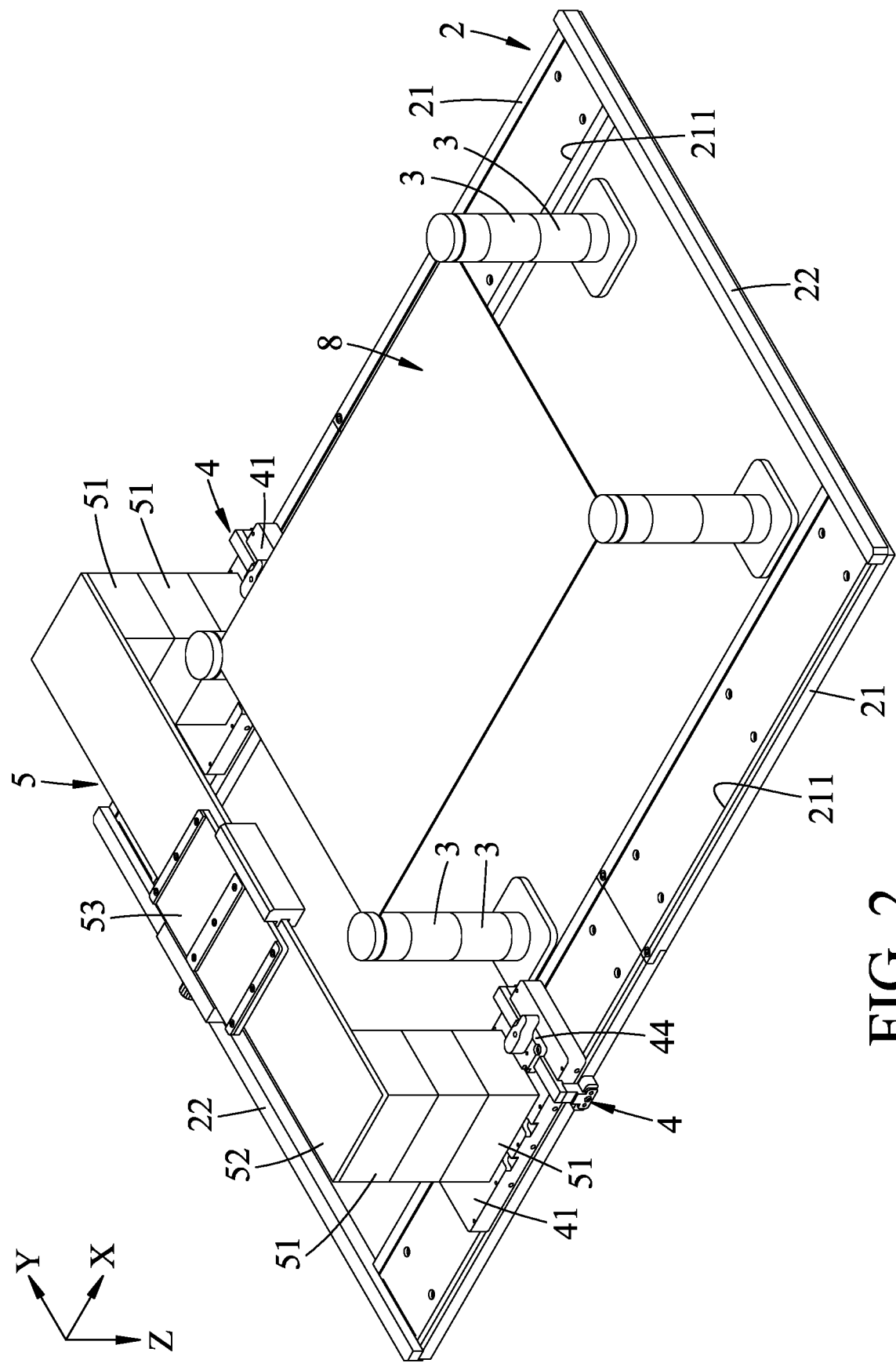
FIG. 2 is a perspective view illustrating a low friction horizontal probing fixture according to an embodiment of the disclosure to probe a test workpiece.
Figure 3:
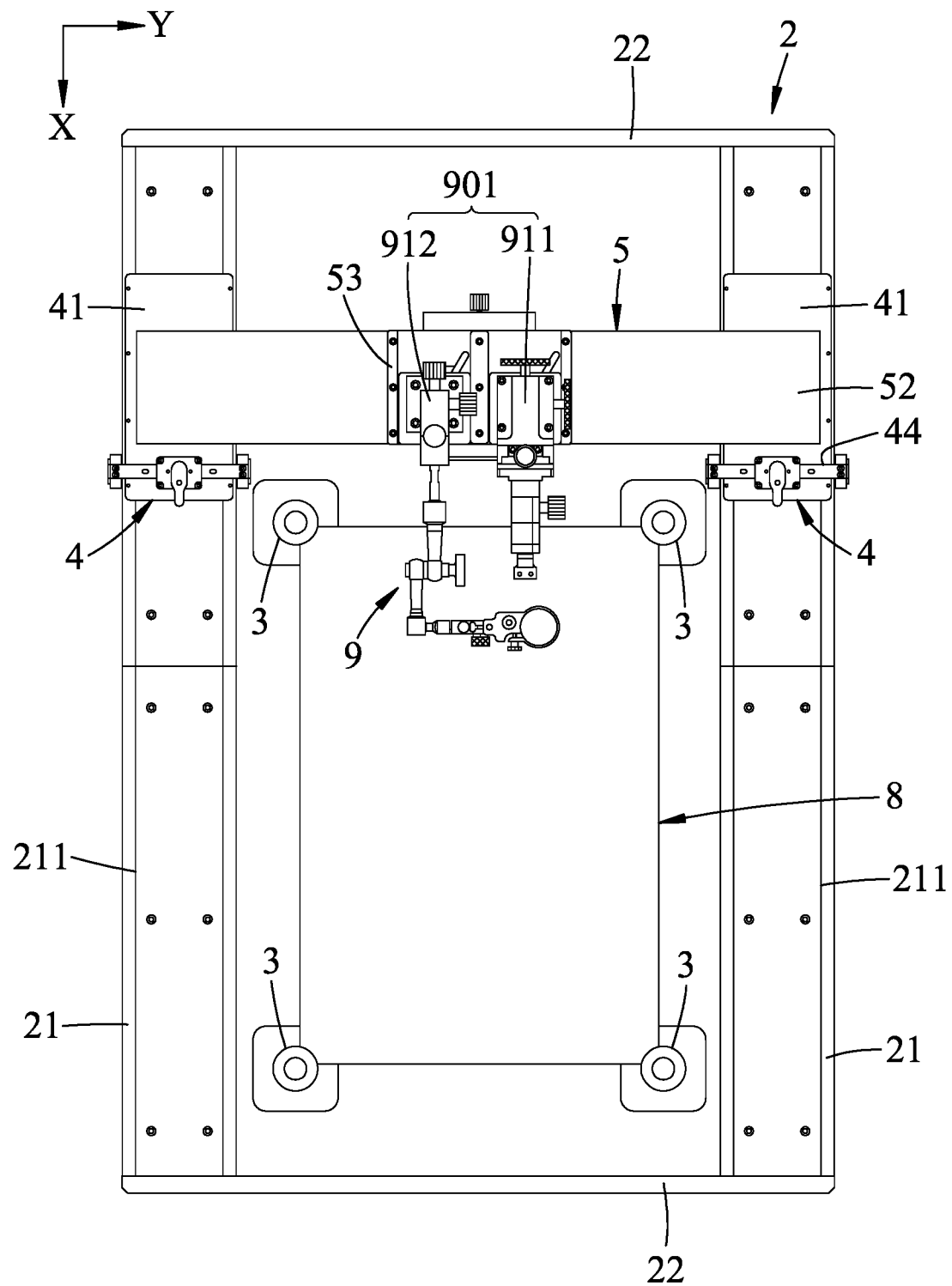
FIG. 3 is a top view of the embodiment illustrating the low friction horizontal probing fixture adapted for cooperating with a probe unit to probe the test workpiece.
Figure 4:
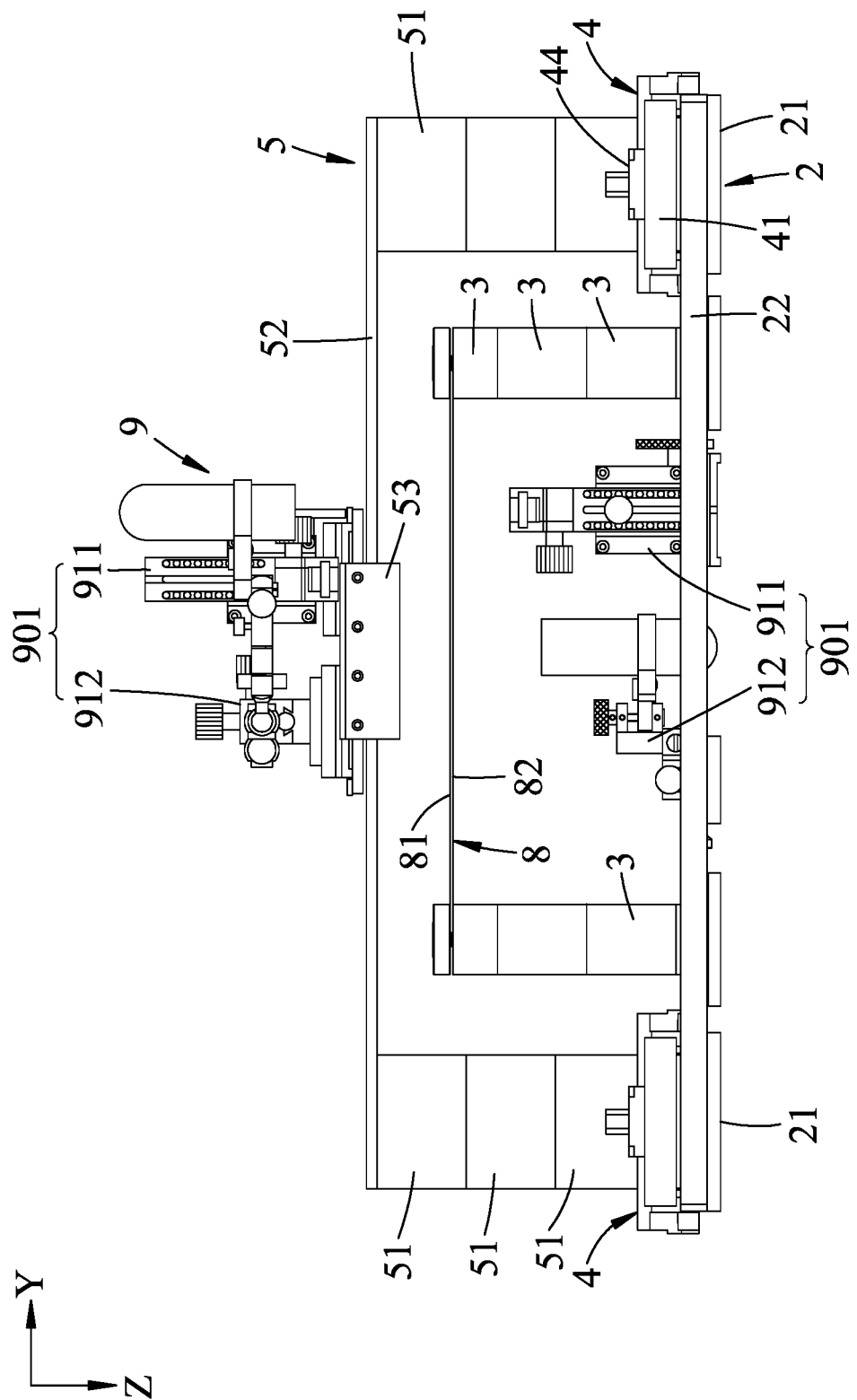
FIG. 4 is a front view of FIG. 3 illustrating the low friction horizontal probing fixture adapted for cooperating with two probe subunits of the probe unit to probe two opposite sides of the test workpiece.

FIGS. 2 to 4 illustrate a low friction horizontal probing fixture according to an embodiment of the disclosure adapted for cooperating with a probe unit 9 to probe a test workpiece 8. In this embodiment, the probe unit 9 has two probe subunits 901. Each of the probe subunits 901 has a probe holder 911 and a microscope holder 912. The test workpiece 8 is a printed circuit board that has a top surface 81 and a bottom surface 82. The low friction horizontal probing fixture of the disclosure includes a base unit 2, a plurality of lifting members 3, two slide units 4, and a carrier unit 5.

The base unit 2 has two rails 211 are elongated in a first direction (X). In this embodiment, the base unit 2 includes two base seats 21 and two positioning members 22. The base seats 21 are parallel to each other, are spaced apart from each other in a second direction (Y) perpendicular to the first direction (X), and respectively have the rails 211. Each of the base seats 21 is elongated in the first direction (X). The positioning members 22 are parallel to each other, are spaced apart from each other in the first direction (X), and interconnect the base seats 21.

Figure 5:
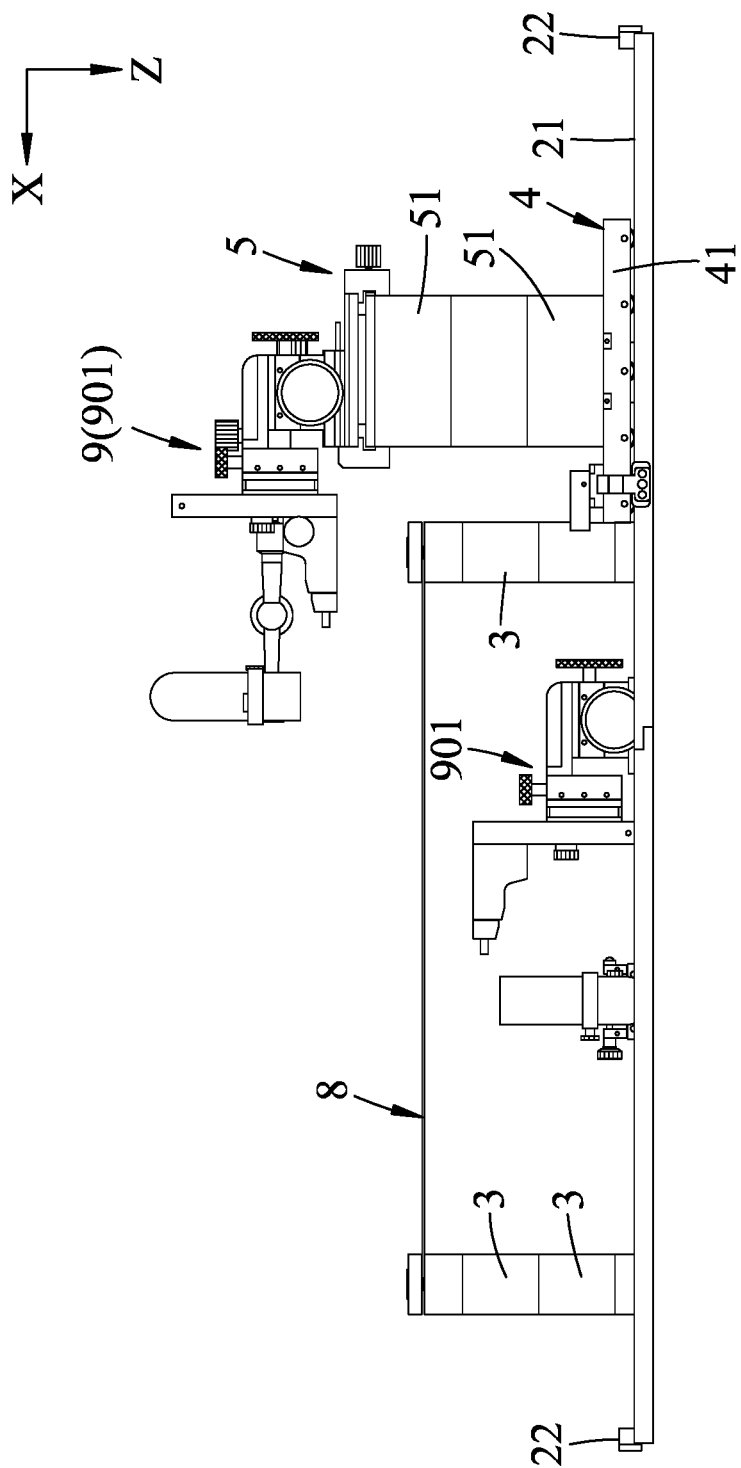
FIG. 5 is a side view of FIG. 3.
Figure 6:
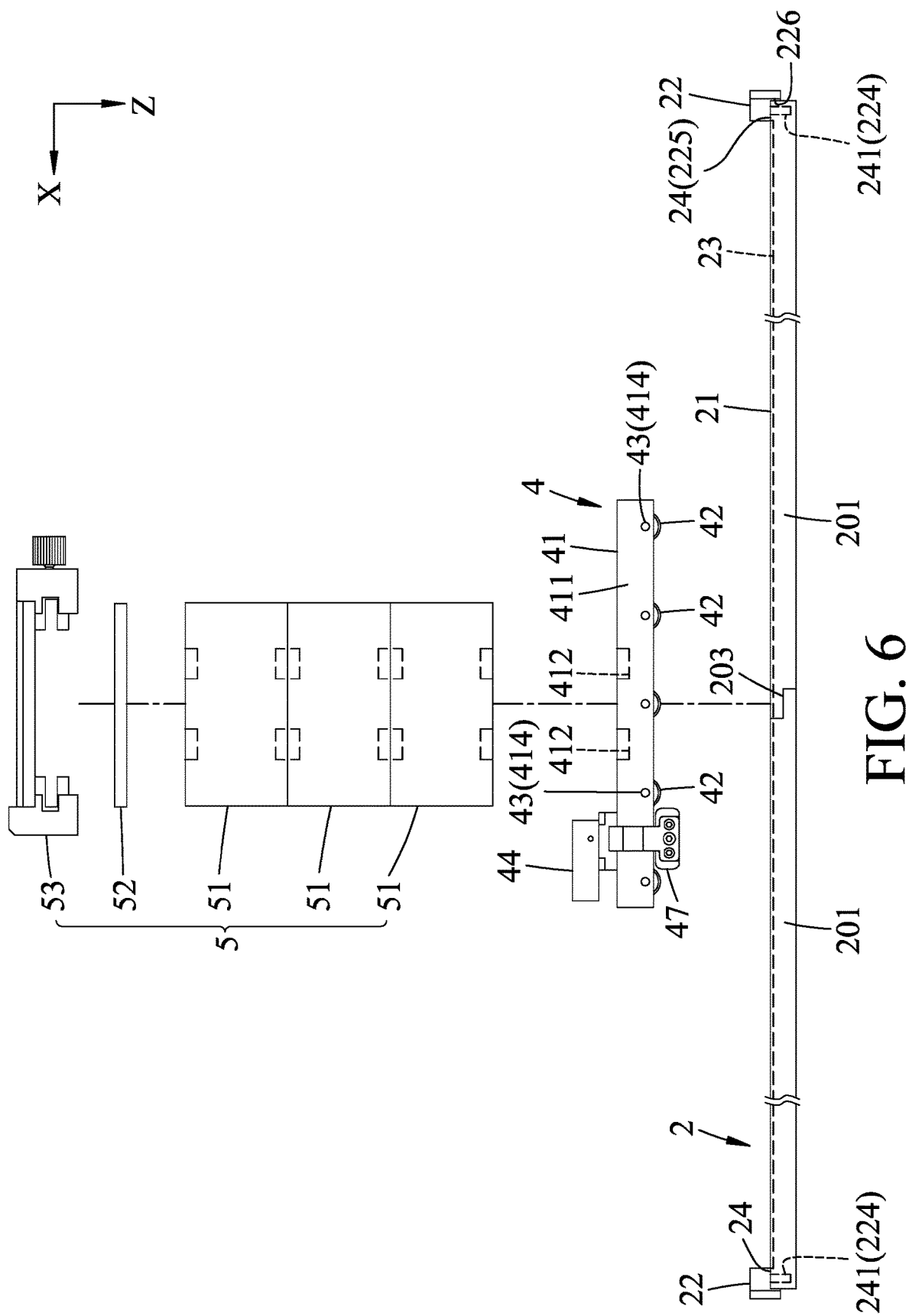
FIG. 6 is a side exploded view of the embodiment illustrating a base unit, a slide unit, and a carrier unit of the low friction horizontal probing fixture.
Figure 7:
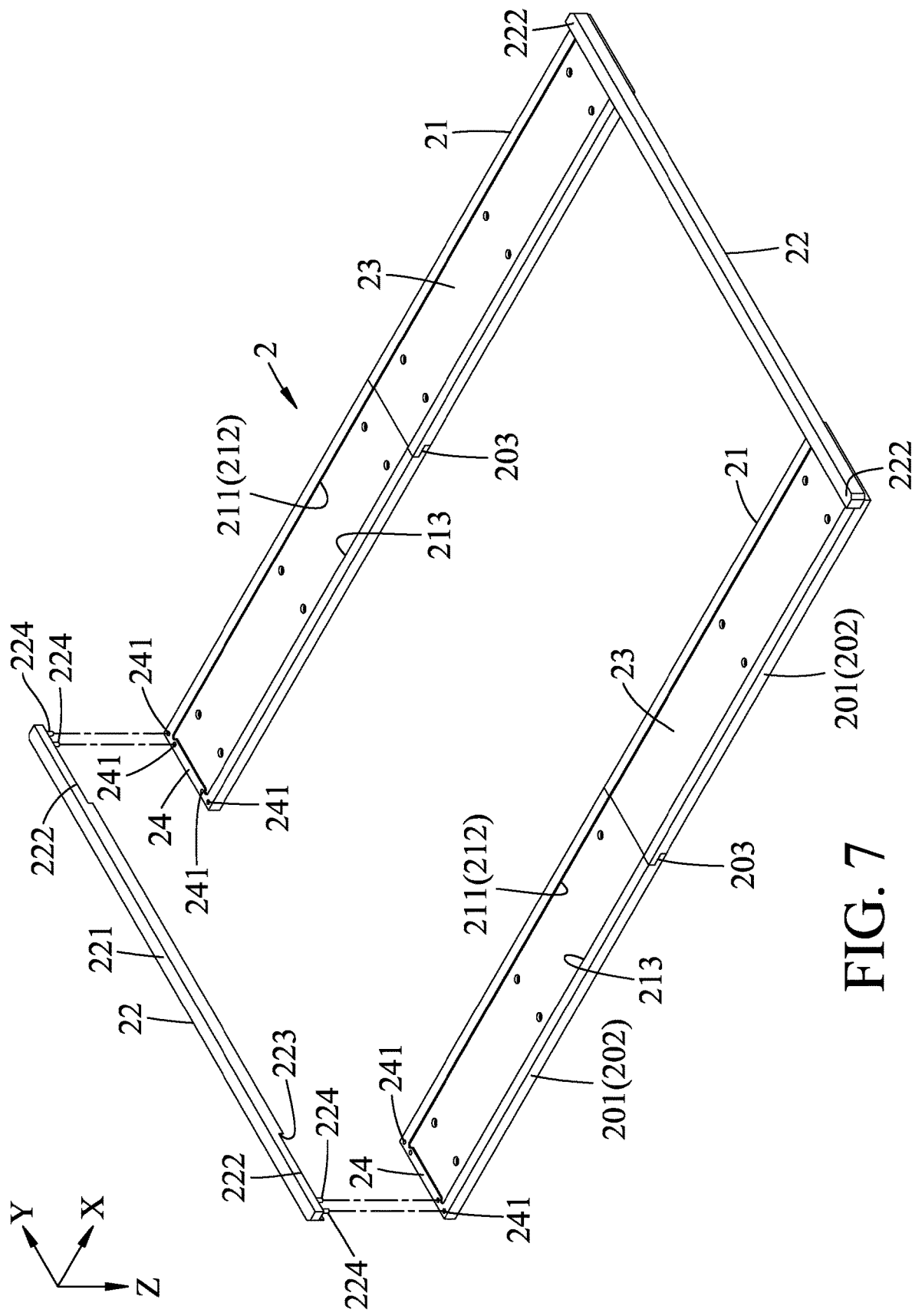
FIG. 7 is a partly exploded perspective view of the embodiment illustrating two base seats and two positioning members of the base unit.

Referring to FIGS. 5 to 7, each of the base seats 21 further has a flat portion 23 and two halting portions 24. The flat portion 23 is rectangular and has two ends opposite to each other in the first direction (X). The halting portions 24 extend respectively and upwardly from the two ends of the flat portion 23 in a top-bottom direction (Z) perpendicular to the first direction (X) and the second direction (Y). In this embodiment, each of the base seats 21 further has a plurality of first engaging members 241 disposed on the halting portions 24. The first engagement members 241 are configured as recessed holes and are arranged in pairs. For each of the base seats 21, the rail 211 has a first rail portion 212 and a second rail portion 213 that are respectively formed on two opposite sides of the flat portion 23 in the second direction (Y). Each of the base seats 21 may be assembled by at least two base plates 201. Each of the base plates 201 may have a plate body 202 and a mating portion 203 formed on a side of the plate body 202. The mating portions 203 of the base plates 201 are removable to mate with each other so as to assemble the respective base seat 21. As a result, a size of the base seat 21 may be reduced when the mating portions 203 of the base plates 201 are removed from each other (i.e., dissembled) to facilitate moving of the base seat 21 from one place to another. However, in some variant embodiments, each of the base seats 21 may be a one-piece plate.

Each of the positioning members 22 has a positioning body 221 and two coupling portions 222. The positioning body 221 is elongated in the second direction (Y). The coupling portions 222 extend respectively from two opposite ends of the positioning member 221. Each of the coupling portions 222 has two second engaging members 224 that are engaged respectively with a corresponding pair of the first engaging members 241 of a corresponding one of the base seats 21. In this embodiment, for each of the positioning members 22, each of the coupling portions 222 has an L-shaped grooved segment 223 that is elongated in the second direction (Y), that is engaged with a respective one of the base seats 21, and that has an end surface 225 and a side surface 226. The end surface 225 is in contact with a top surface of the respective one of the base seats 21. The side surface 226 extends perpendicularly from the end surface 225 and faces a lateral surface of the respective one of the base seats 21. The second engaging members 224 of the coupling portions 222 are configured as pins and are disposed on the end surfaces 225 of the grooved segments 223 of the coupling portions 222. When the second engaging members 224 of each of the coupling portions 222 are engaged respectively with a different corresponding pair of the first engaging members 241 of the corresponding one of the base seats 21, a distance between the base seats 21 may vary. By virtue of the second engaging members 224 of each of the coupling portions 222 of each of the positioning members 22 engaging respectively with the corresponding pair of the first engaging members 241 of the corresponding one of the base seats 21, the positioning members 22 are ensured to be perpendicular to the base seats 21, and the positioning members 22 and the base seats 21 are prevented from being assembled in a parallelogram configuration. In some other variant embodiments, the first engagement members 241 may be configured as pins, and the second engagement members 224 may be configured as recessed holes.

Referring back to FIGS. 3, 4, and 6, the lifting members 3 are surrounded by the base seats 21 and the positioning members 22, and are stacked in the top-bottom direction (Z) so that the lift members 3 may lift the test workpiece 8. In this embodiment, each of the lift members 3 is a ferrous block with a magnet disposed on a top surface thereof, so that the lift members 3 stacked in the top-bottom direction (Z) may be magnetically attracted by each other so as to be positioned. The lift members 3 are arranged to lift four corners of the test workpiece 8.

The slide units 4 are respectively disposed on and slidable along the rails 211. Each of the slide units 4 has a slide seat 41, a plurality of rolling members 42, a plurality of shafts 43, and a lock mechanism 44.

Figure 8:
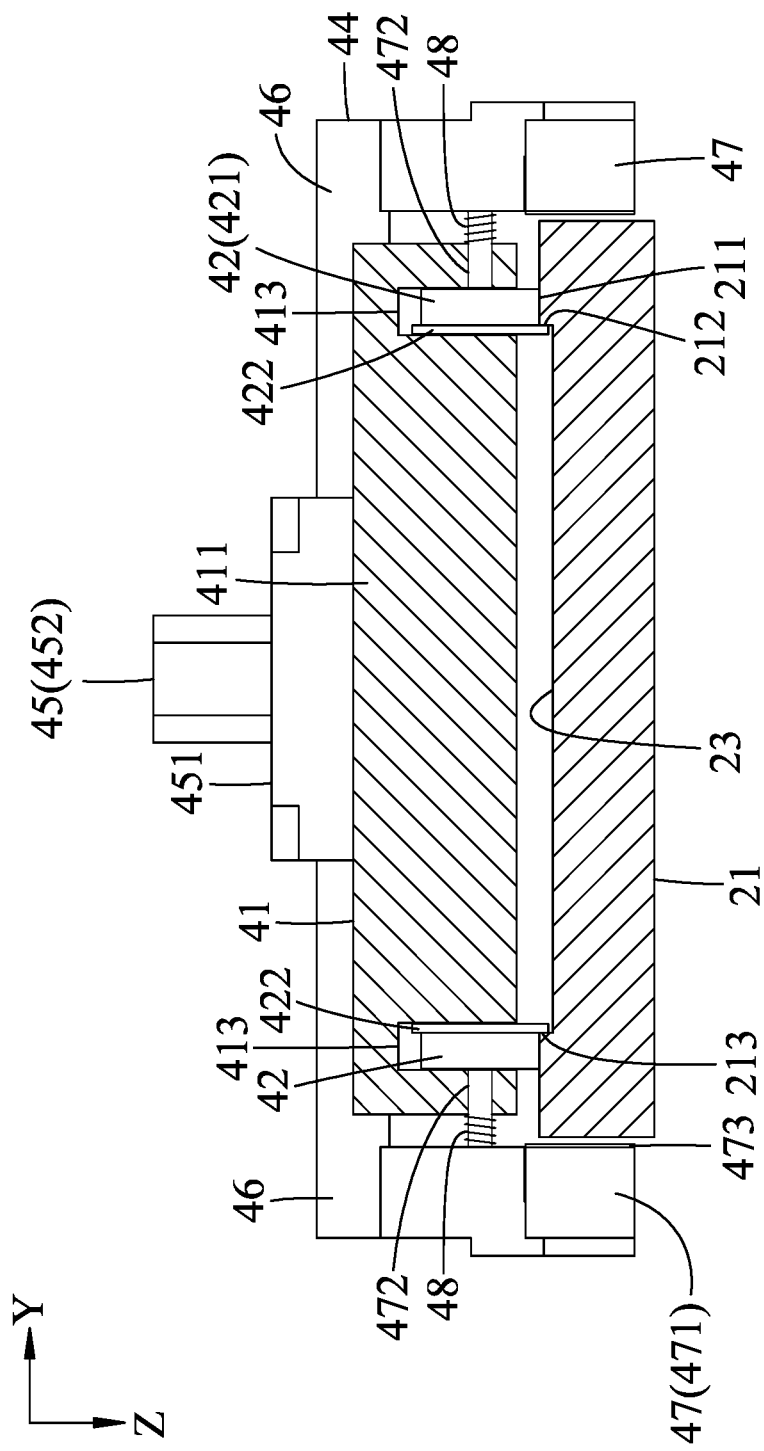
FIG. 8 is a partly sectional view of the embodiment illustrating the slide unit slidable along the base seat.
Figure 9:
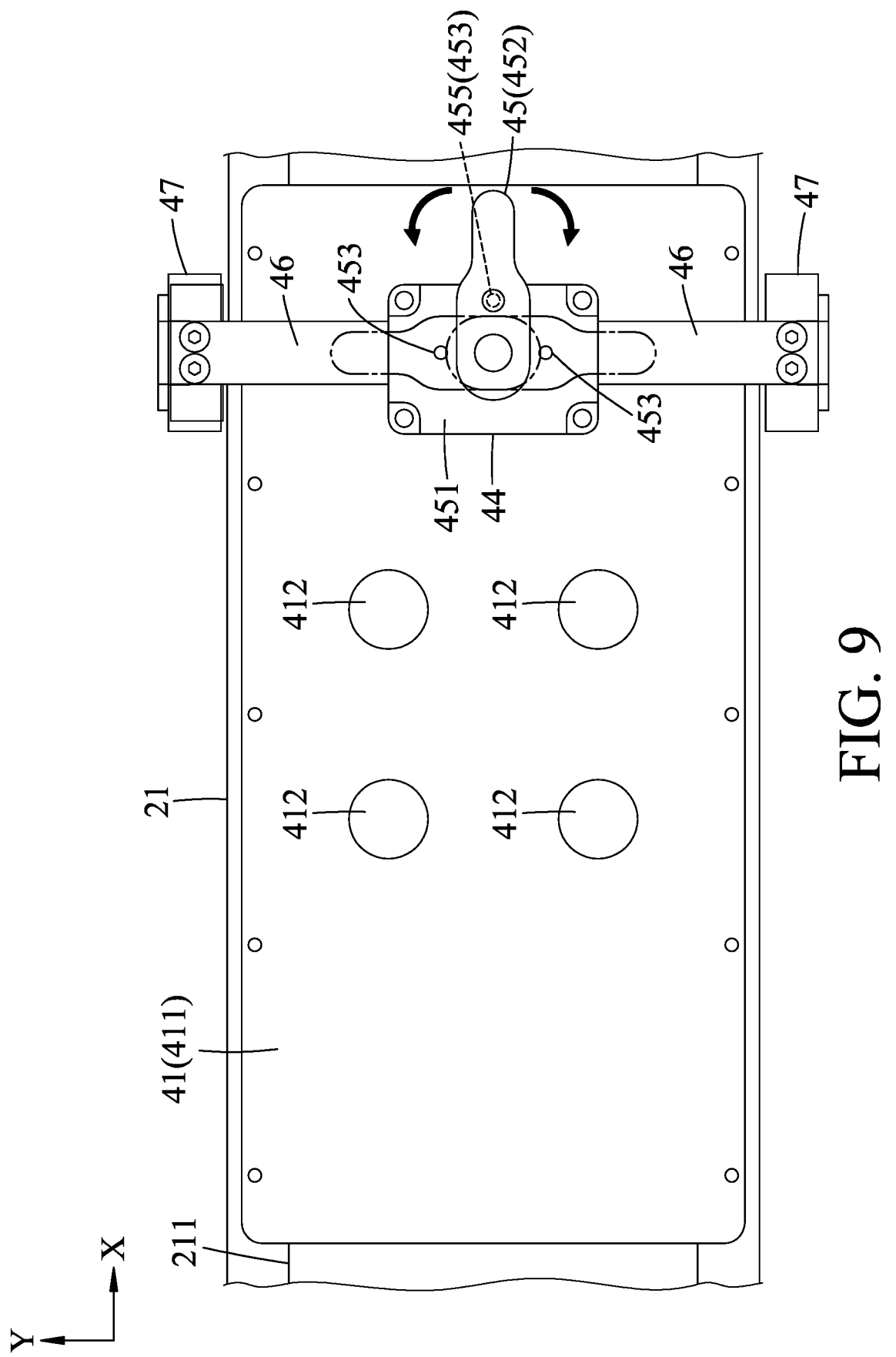
FIG. 9 is a fragmentary top view of the embodiment illustrating a lock mechanism of the slide seat of the slide unit, which can make the slide unit immovably positioned relative to the base seat.

As shown in FIGS. 6, 8, and 9, the slide seat 41 of each of the slide units 4 is disposed adjacent to a respective one of the rails 211, and has a sliding body 411 and four magnetic members 412. The sliding body 411 of the slide seat 41 has a plurality of installation grooves 413 and a plurality of through holes 414. The installation grooves 413 are elongated in the first direction (X) and are spaced part from each other in the second direction (Y). The through holes 414 are formed in sliding body 411 of the slide seat 41 and communicate the installation grooves 413 with an external environment. Each of the magnetic members 412 is a strong magnet embedded in the sliding body 411. The magnetic members 412 are spaced apart from each other in the first direction (X) and the second direction (Y) in a manner that polarities of any two adjacent ones of the magnetic members 412 are different.

For each of the slide units 4, the rolling members 42 are rotatably mounted to two opposite sides of the slide seat 41 in the second direction (Y), and are rollable on the respective one of the rails 211 so that the slide seat 41 is movable along the respective one of the rails 211. In this embodiment, for each of the slide unit 4, the rolling members 42 are rotatably installed in the installation grooves 413 of the slide seat 41, and each of the rolling members 42 is in rotating contact with a corresponding one of the first rail portion 212 and the second rail portion 213 of the respective one of the rails 211. The halting portions 24 of each of the base seats 21 serve to halt movement of corresponding ones of the rolling members 42, thereby preventing removal of the slide units 4 from the base seats 21, respectively. Furthermore, each of the rolling members 42 has a rolling body 421 and a flange 422. The flange 422 extends outwardly from the rolling body 421 and abuts against the corresponding one of the first rail portion 212 and the second rail portion 213 of the respective one of the rails 211.

The shafts 43 extend respectively through the through holes 414 and respectively through the rolling members 42 such that the rolling members 42 are rotatable about the shafts 43.

The lock mechanism 44 of each of the slide units 4 is disposed on the slide seat 41 and is operable to position the slide seat 41 relative to the respective one of the rails 211. In this embodiment, the lock mechanism 44 of each of the slide units 4 has a knob subunit 45, two linkage bars 46, two locking members 47, and two resilient members 48.

Figure 10:
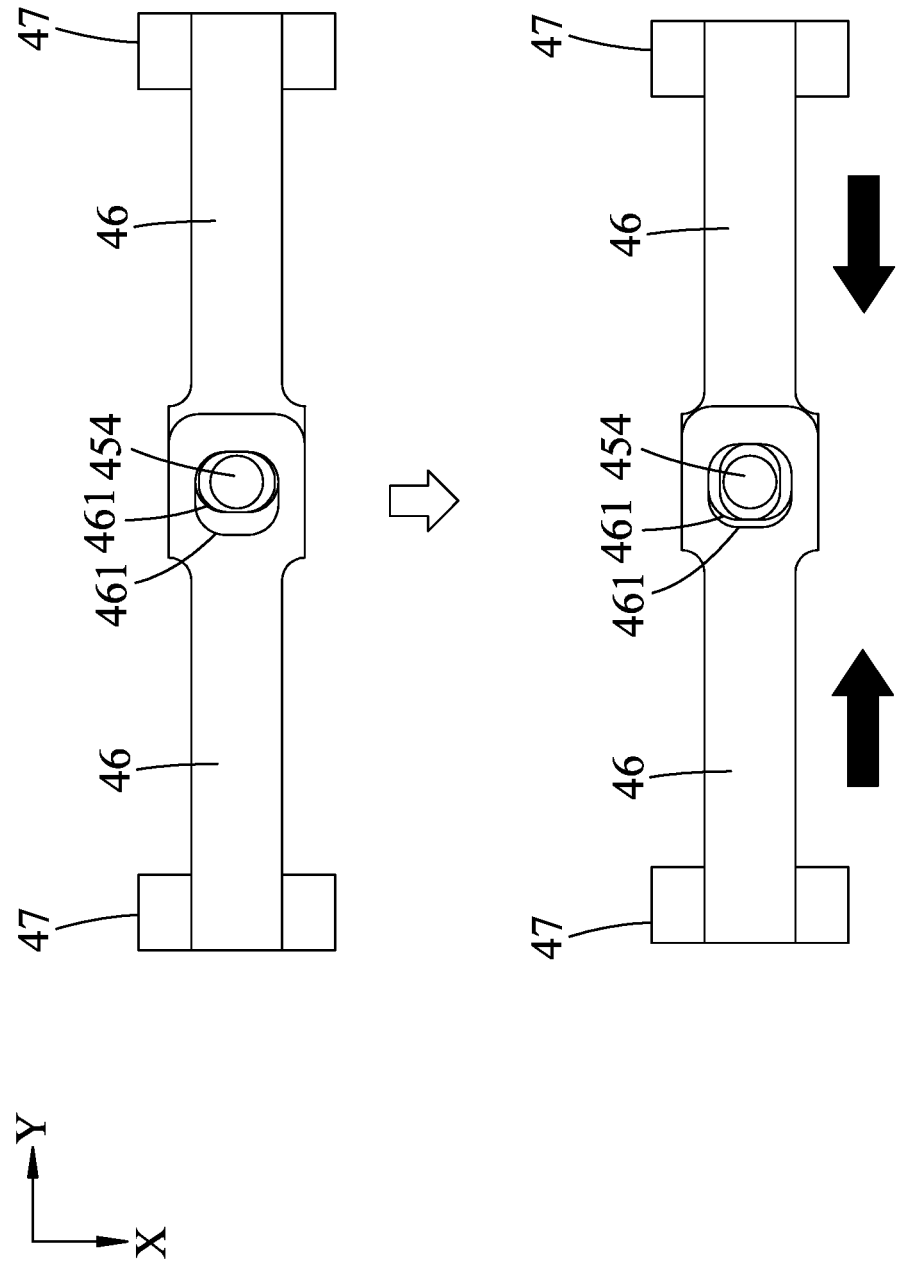
FIG. 10 is a top view of the embodiment illustrating an elliptical block of the lock mechanism being rotatable between a releasing position and a locking position to drive two movement of linkage bars together with two locking members.

Referring to FIGS. 8 to 10, for each of the slide units 4, the knob subunit 45 has a mounting table 451, a knob 452, and an elliptical block 454. The mounting table 451 is fixed to the slide seat 41 and has a plurality of positioning holes 453. The knob 452 is rotatably disposed on the mounting table 451 and has the elliptical block 454 at a bottom end thereof. The knob 452 further has a positing ball 455 that is removably engaged with one of the positioning holes 453.

For each of the slide units 4, the linkage bars 46 are connected to the knob subunit 45. Each of the linkage bars 46 has a first end that is formed with a locking hole 461, and a second end that is opposite to the first end. The first ends of the linkage bars 46 are mounted to the mounting table 451. The second ends of the linkage bars 46 are disposed respectively at opposite sides of the knob subunit 45. The locking holes 461 of the linkage bars 46 overlap each other. The elliptical block 454 of the knob subunit 45 is rotatably disposed in the locking holes 461 of the linkage bars 46, and has a major axis and a minor axis.

For each of the slide units 4, the locking members 47 extend respectively from the second ends of the linkage bars 46 and are disposed respectively adjacent to opposite ends of a respective one of the base seats 21. In this embodiment, each of the locking members 47 has a clam arm 471, a moving shaft 472, and a frictional pad 473. The clamp arm 471 extends downwardly from the second end of a respective one of the linkage bars 46. The moving shaft 472 extends from the clamp arm 471 into the slide seat 41. The frictional pad 473 is fixed to the clamp arm 471 and faces the respective one of the base seats 21.

For each of the slide units 4, each of the resilient members 48 is disposed between the slide seat 41 and a respective one of the locking members 47. In this embodiment, each of the resilient members 48 is a compression spring that is sleeved on the moving shaft 472 of the respective one of the locking members 47, and that is disposed compressibly between the clamp arm 471 and the slide seat 41.

For each of the slide units 4, the elliptical block 454 is rotatable relative to the slide seat 41 between a releasing position (a top part shown in FIG. 10), where the minor axis of the elliptical block 454 is parallel to the second direction (Y), and where the linkage bars 46 are movable relative to each other in a manner that the locking members 47 are moved away from the respective one of the base seats 21 such that the slide unit 4 is movable relative to the respective one of the base seats 21, and a locking position (a bottom part shown in FIG. 10), where a major axis of the elliptical block 454 is parallel to the second direction (Y), and where the linkage bars 46 are driven by the elliptical block 454 to move toward each other such that the locking members 47 are moved to clamp the respective one of the base seats 21 therebetween, and such that the slide seat 41 is immovably positioned relative to the respective one of the base seats 21. For each of the slide units 4, each of the resilient members 48 of the lock mechanism 44 are compressed between the slide seat 41 and a respective one of the locking members 47 for biasing the respective one of the locking members 47 away from the slide seat 41 when the elliptical block 454 is rotated to the locking position. Because the knob 452 is rotatably disposed on the mounting table 451 and has the elliptical block 454 rotatably disposed in the locking holes 461 of the linkage bars 46, and because the elliptical block 454 has the major axis and the minor axis, rotation of the elliptical block 454 by rotating the knob 452 drives movement of the linkage bars 46 such that the locking members 47 are moved toward or away from each other for the slide seat 41 to be immovably positioned to or slidable along the respective one of the rails 211. In this embodiment, by virtue of frictional pads 473 of the locking members 47, the locking members 47 are enhanced to clamp the respective one of the base seat 21 therebetween. Specifically, the number of the positioning holes 453 is three so that the knob 452 may be positioned at three positions. However, the position the knob 452 is not limited hereto. For example, the elliptical block 454 may have two flattened surfaces respectively formed on two opposite ends of the major axis of the elliptical block 454 for positioning.

For each of the slide units 4, by virtue of the rolling members 42 in rotating contact with the respective one of the rails 211, the slide unit 4 may be driven with less effort to smoothly slide along the respective one of the rails 211. When the slide unit 4 slides to a predetermined location, by virtue of rotating the knob 452 to rotate the elliptical block 454 at the locking position, the slide seat 41 of the slide unit 4 is immovably positioned relative to the respective one of the rails 211.

Referring back to FIGS. 2, 4, and 6, the carrier unit 5 is connected co-movably to the slide units 4. The carrier unit 5 has a plurality of magnetic blocks 51, a guiding member 52, and a moving seat 53. The magnetic blocks 51 are stacked on top surfaces of the slide seats 41 of the slide units 4 in the top-bottom direction (Z). The guiding member 52 is elevated by the magnetic blocks 51, is elongated in the second direction (Y), and interconnects the slide units 4. The moving seat 53 is disposed on and movable along the guiding member 52, and is mounted with a respective one of the probe subunits 901 of the probe unit 9. The magnetic members 412 of each of the slide units 4 attract a corresponding one of the magnetic blocks 51. Because the polarities of any two adjacent ones of the magnetic members 412 are different, by virtue of magnetic attraction of the magnetic members 412, the magnetic blocks 51 may be magnetically and automatically guided to be assembled and positioned to each other.

The magnetic blocks 51 are movable along the top surfaces of the slide seats 41 for alleviating resistive forces resulting from movement of the slide seats 41 relative to the rails 211. The resistive forces resulting from the movement of the slide seats 41 relative to the rails 211 may occur because the rails 211 of the base seats 21 may be nonparallel to each other after the base seats 21 and the positioning members 22 are assembled as a result of mechanical production tolerances of the base seats 21 and the positioning members 22, or because the guiding member 52 is unevenly forced to be non-perpendicular to the base seats 21. By virtue of slightly moving the magnetic blocks 51 to be magnetically attracted along the top surfaces of the slide seats 41, the resistive forces resulting from movement of the slide seats 41 relative to the rails 211 may be alleviated, thereby facilitating the slide units 4 to respectively and smoothly slide along the rails 211.

When each of the slide units 4 slides in the first direction (X) to the predetermined location, the moving seat 53 is moved along the guiding member 52 such that the probe subunits 901 mounted on the moving seat 53 is moved to a probing location. After the elliptical block 454 of each of the slide units 4 is rotated by the knob 452 to the locking position, each of the slide unit 4 is immovably positioned relative to the respective one of the rails 211 so that the probe subunits 901 mounted on the moving seat 53 may probe the top surface 81 of the test workpiece 8 while the bottom surface 82 of the test workpiece 8 is probed by another probe subunit 901 of the probe unit 9 that is disposed under the test workpiece 8. Accordingly, the top surface 81 and the bottom surface 82 of the test workpiece 8 may be simultaneously probed without turning over the test workpiece 8.

Figure 11:
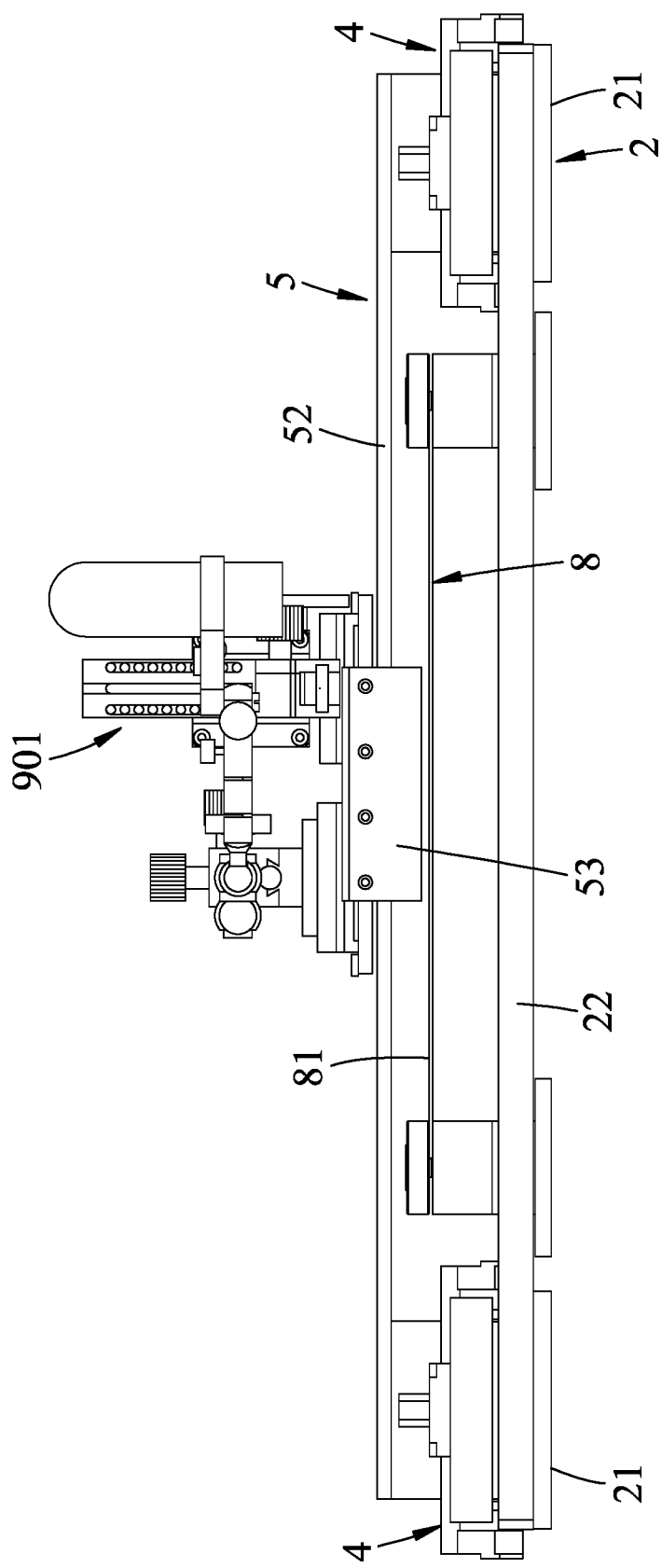
FIG. 11 is a view similar to FIG. 4, but illustrating the low friction horizontal probing fixture in cooperation with the probe subunit to probe one side of the test workpiece.

Referring to FIG. 11, when only the top surface 81 of the workpiece 8 is required to be probed, the number of the magnetic blocks 51 and the number of the lifting members 3 may be reduced, and another probe subunit 901 of the probe unit 9 may be omitted from the bottom surface 82 of the test workpiece 8.

In some embodiments, the moving seat 53 may be omitted from the guiding member 52 while the probe subunit 901 may be directly mounted to the guiding member 52.

Figure 12:
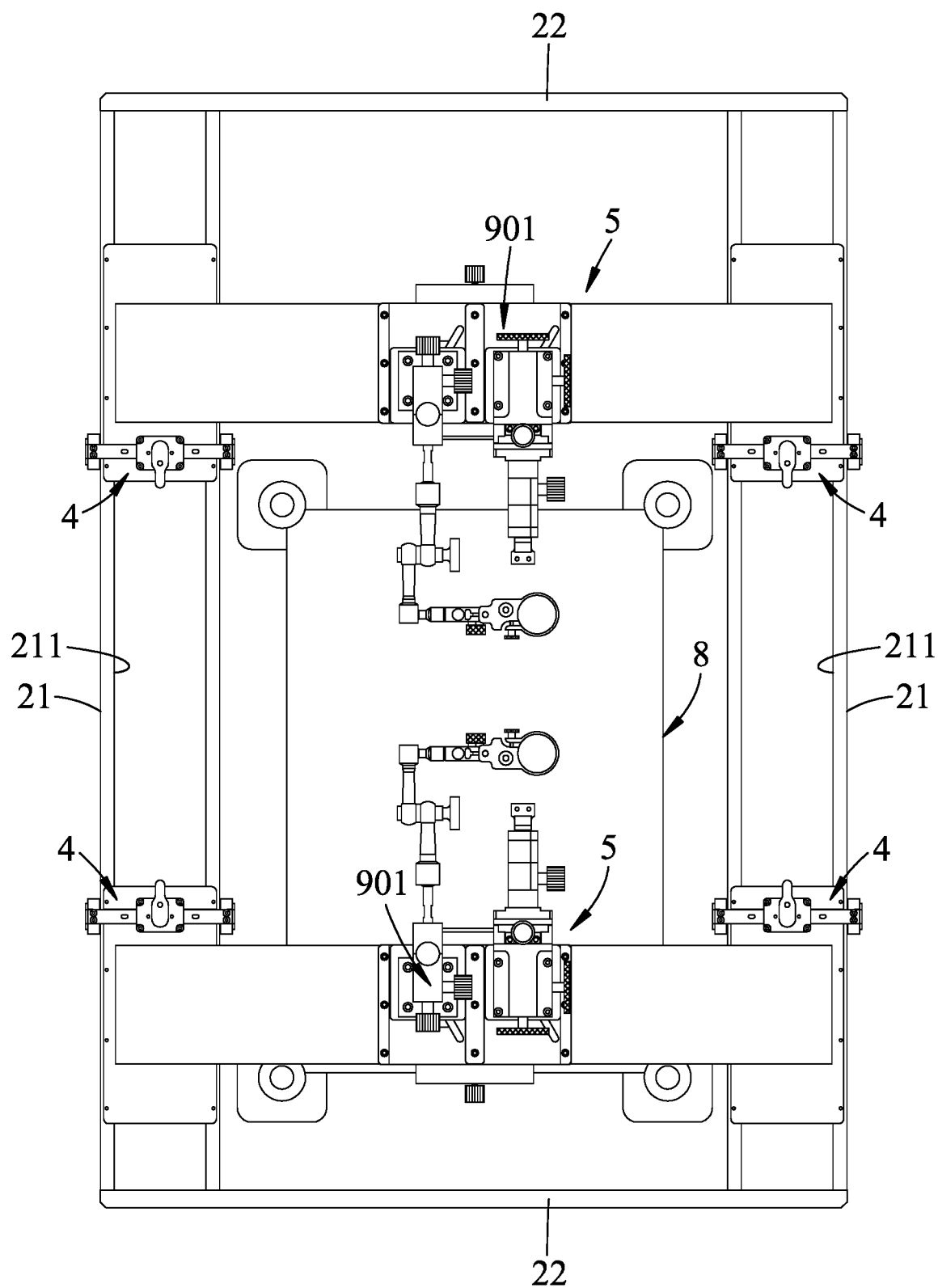
FIG. 12 is a view similar to FIG. 3, but illustrating a variant embodiment of the low friction horizontal probing fixture that includes four slide units and two carrier units.

FIG. 12 illustrates a variant embodiment of the low friction horizontal probing fixture that includes four slide units 4 and two carrier units 5. Each of the carrier units 5 is connected co-movably to corresponding two of the slide units 4 and is mounted with a corresponding one of the probe subunits 901 so that the top surface 81 of the test workpiece 8 may be simultaneously probed by a pair of the probe subunits 901.

FIGS. 13 to 18 illustrate variations of the rail 211 and the slide seat 41.

Figure 13:
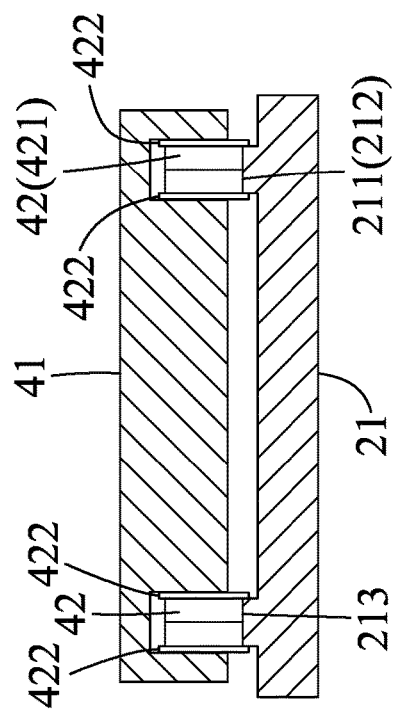
FIGS. 13 to 18 illustrate variant embodiments of a rail and the slide seat of the low friction horizontal probing fixture.

As shown in FIG. 13, in this embodiment, each of the base seats 21 has a protrusion portion 214, and the first rail portion 212 and the second rail portion 213 of the respective one of the rails 211 are respectively formed on two opposite sides of the protrusion portion 214. The flange 422 of each of the rolling members 42 abuts against and is in rotating contact with the corresponding one of the first rail portion 212 and the second rail portion 213 of the respective one of the rails 211. However, in some variant embodiments, each of the rolling members 42 may be dispensed with the flange 422 whereas a side surface of each of the rolling members 42 may abut against and be in rotating contact with the corresponding one of the first rail portion 212 and the second rail portion 213 of the respective one of the rails 211.

Figure 14:
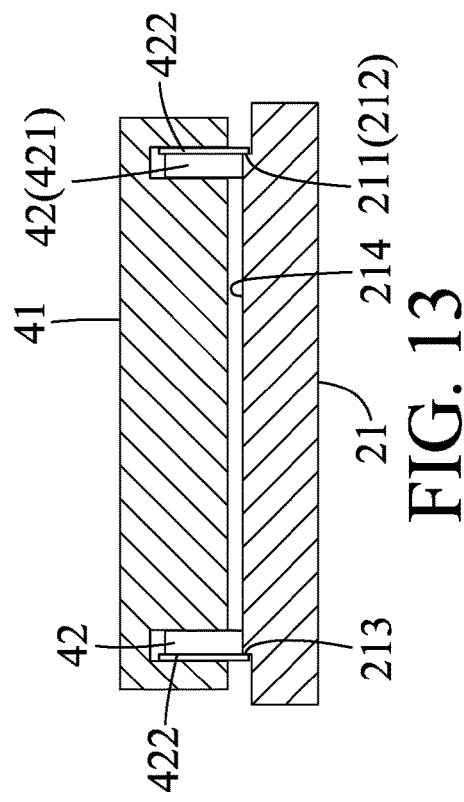

Referring to FIG. 14, in this embodiment, each of the first rail portion 212 and the second rail portion 213 is a protrusion. The rolling member 42 has two flanges 422 that extend outwardly and respectively from two opposite side surfaces of the rolling body 421 and that abut against the corresponding one of the first rail portion 212 and the second rail portion 213.

Figure 15:
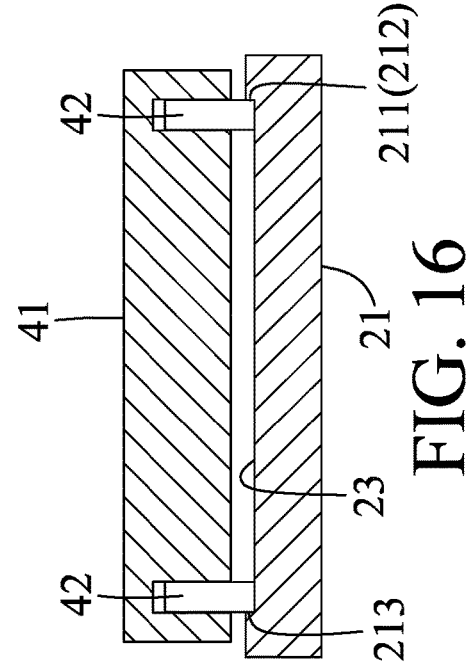

Referring to FIG. 15, in this embodiment, each of the first rail portion 212 and the second rail portion 213 of the rail 211 is a recess. The flange 422 extends outwardly around the rolling body 421 in a manner that the rolling body 421 is symmetrical relative to the flange 422. The flange 422 is engaged and in rotating contact with the corresponding one of the first rail portion 212 and the second rail portion 213. However, in some variant embodiments, the flange 422 may be omitted from the rolling body 421 whereas the rolling body 421 is engaged and in rotating contact with the corresponding one of the first rail portion 212 and the second rail portion 213.

Figure 16:
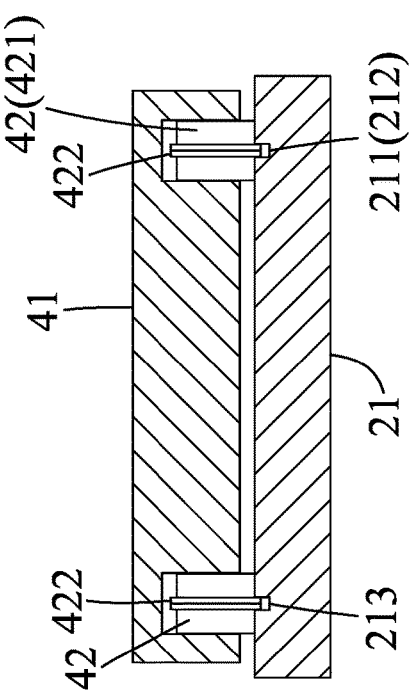

Referring to FIG. 16, in this embodiment, the rolling member 42 is dispensed with the flange 422. The first rail portion 212 and the second rail portion 213 respectively extend upwardly from two opposite sides of the flat portion 23 of the rail 211. The rolling member 42 is rollable on the flat portion 23, and has two opposite side surfaces that abut against and are in rotating contact with the corresponding one of the first rail portion 212 and the second rail portion 213.

Figure 17:
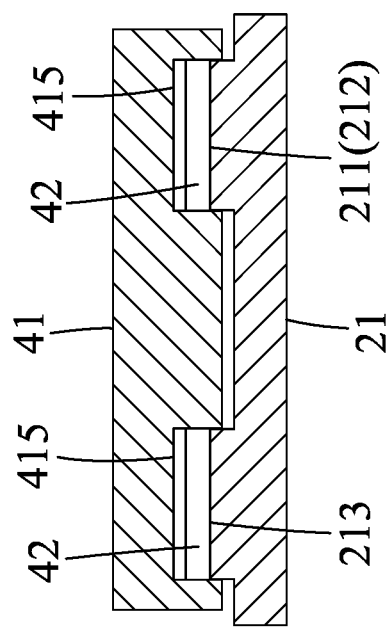

Referring to FIG. 17, in this embodiment, each of the first rail portion 212 and the second rail portion 213 is a protrusion. For each of the slide units 4, the slide seat 41 has two recess portions 415 that are recessed from a bottom side thereof in the top-bottom direction (Z) and that are respectively aligned with the first rail portion 212 and the second rail portion 213 of the respective one of the rails 211. For each of the slide units 4, the rolling members 42 are configured as rolling posts, are mounted in the recess portions 415 in a spaced-apart manner, and are in rotating contact with the first rail portion 212 and the second rail portion 213 of the respective one of the rails 211.

Figure 18:
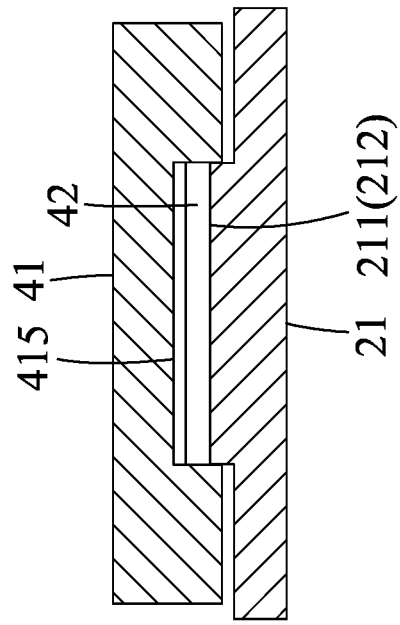

Referring to FIG. 18, in this embodiment, each of said rails 211 has only the first rail portion 212 that is a protrusion. For each of the slide units 4, the slide seat 41 has a recess portion 415 that is recessed from a bottom side thereof in the top-bottom direction (Z) and that is aligned with the first rail portion 212 of the respective one of the rails 211. For each of the slide units 4, the rolling members 42 are configured as rolling posts, are mounted in the recess portion 415 in a spaced-apart manner, and are in rotating contact with the first rail portion 212 of the respective one of the rails 211.

FIGS. 19 to 23 illustrate variant embodiments of the lock mechanism 44.

Figure 19:
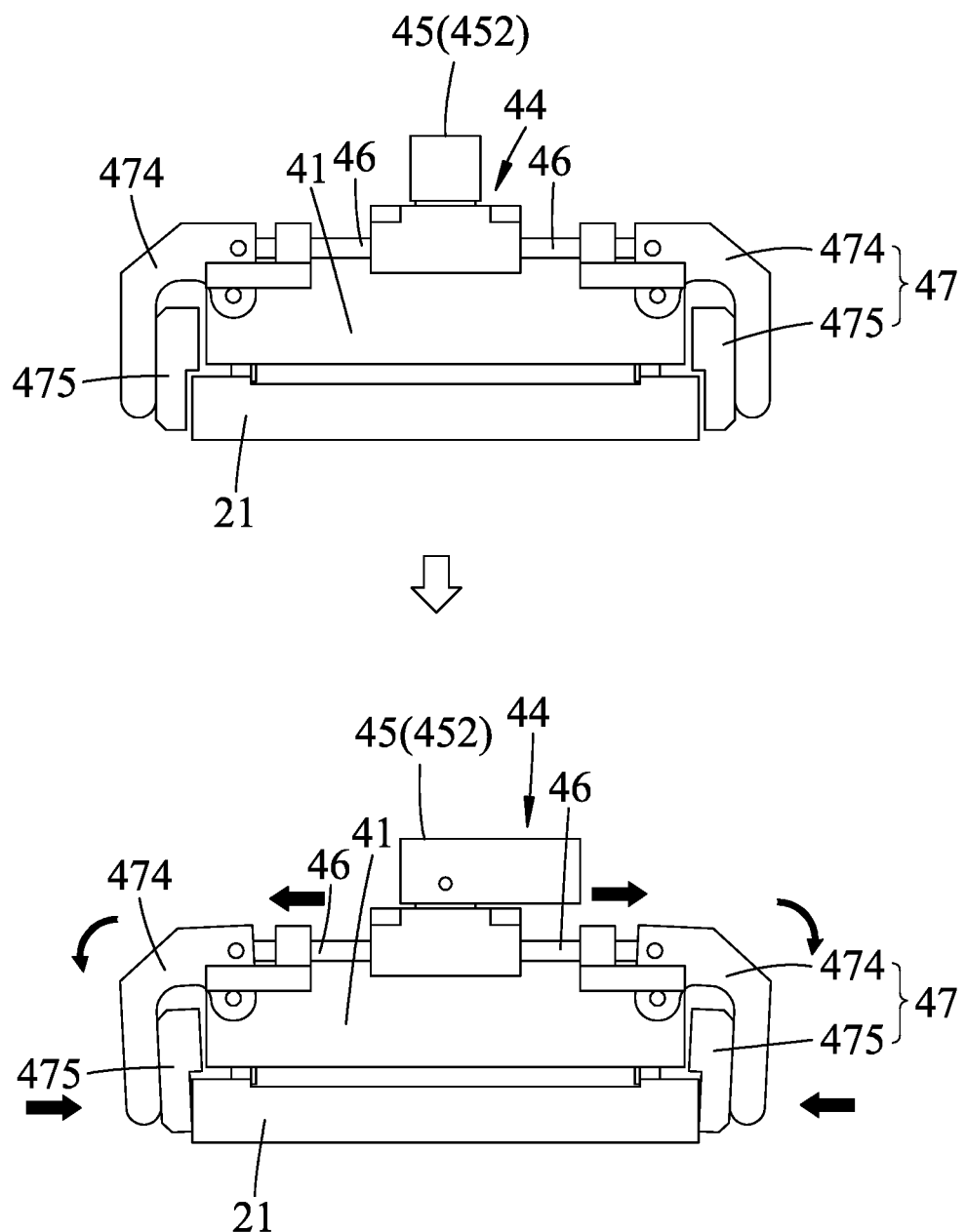
FIGS. 19 to 23 illustrate variant embodiments of a lock mechanism of the low friction horizontal probing fixture.

As shown in FIG. 19, in some variant embodiments, each of the locking members 47 has a hanging arm 474 and a braking pad 475. The hanging arm 474 extends outward and downwardly from a respective one of the linkage bars 46, and is pivotally connected to and rotatable relative to the slide seat 41. The braking pad 475 is fixed to the hanging arm 474 and faces the respective one of the base seat 21. By virtue of rotation of the elliptical block 454 via rotation of the knob 452 (as shown in FIG. 10), when the linkage bars 46 are moved away from each other to drive pivotal rotation of the hanging arms 474 of the locking members 47 toward the slide seat 41, the braking pads 475 are driven to clamp the respective one of the base seats 21 therebetween, such that the slide seat 41 is immovably positioned relative to the respective one of the base seats 21.

Figure 20:
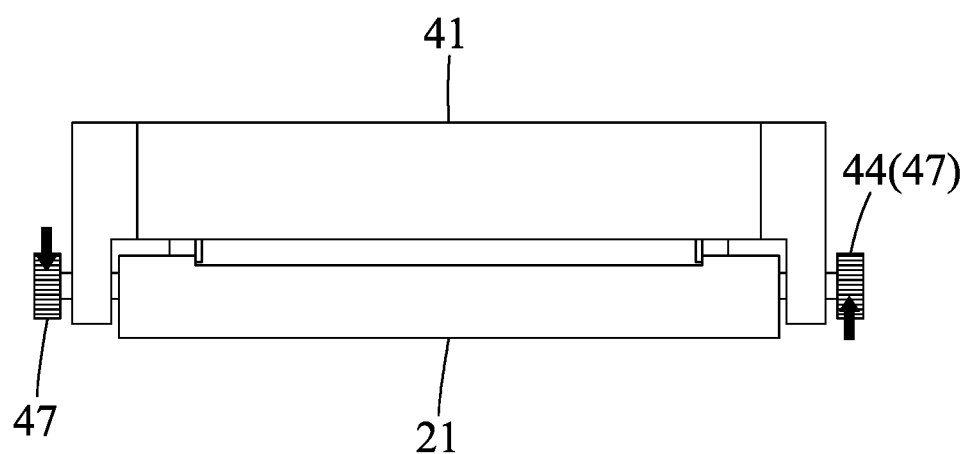

As shown in FIG. 20, in some variant embodiments, the lock mechanism 44 of each of the slide units 4 has four locking members 47 (only two are shown) for threadedly locking the slide seat 41 to the respective one of the base seats 21. Each of the locking members 47 is configured as a bolt.

Figure 21:
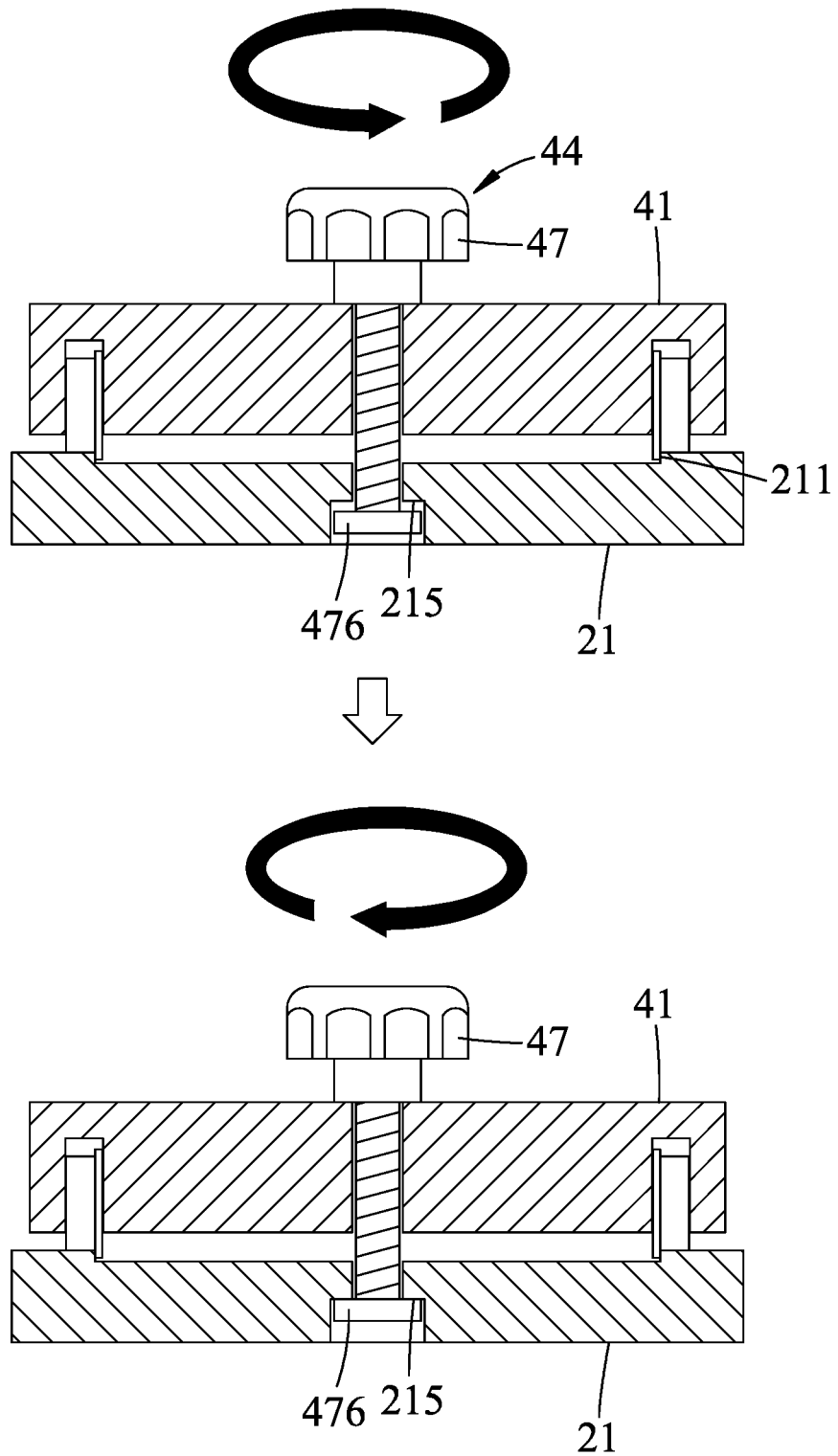

As shown in FIG. 21, in some variant embodiments, each of the base seat 21 has a stepwise hole 215 extending therethrough in the top-bottom direction (Z). The lock mechanism 44 of each of the slide units 4 has only one locking member 47. The locking member 47 extends threadedly into the stepwise hole 215 and has a stop block 476 at a bottom end thereof. When the stop block 476 abuts against a shoulder of the stepwise hole 215 by rotating the locking member 47, the slide seat 41 is immovably positioned relative to the respective one of the base seats 21.

Figure 22:
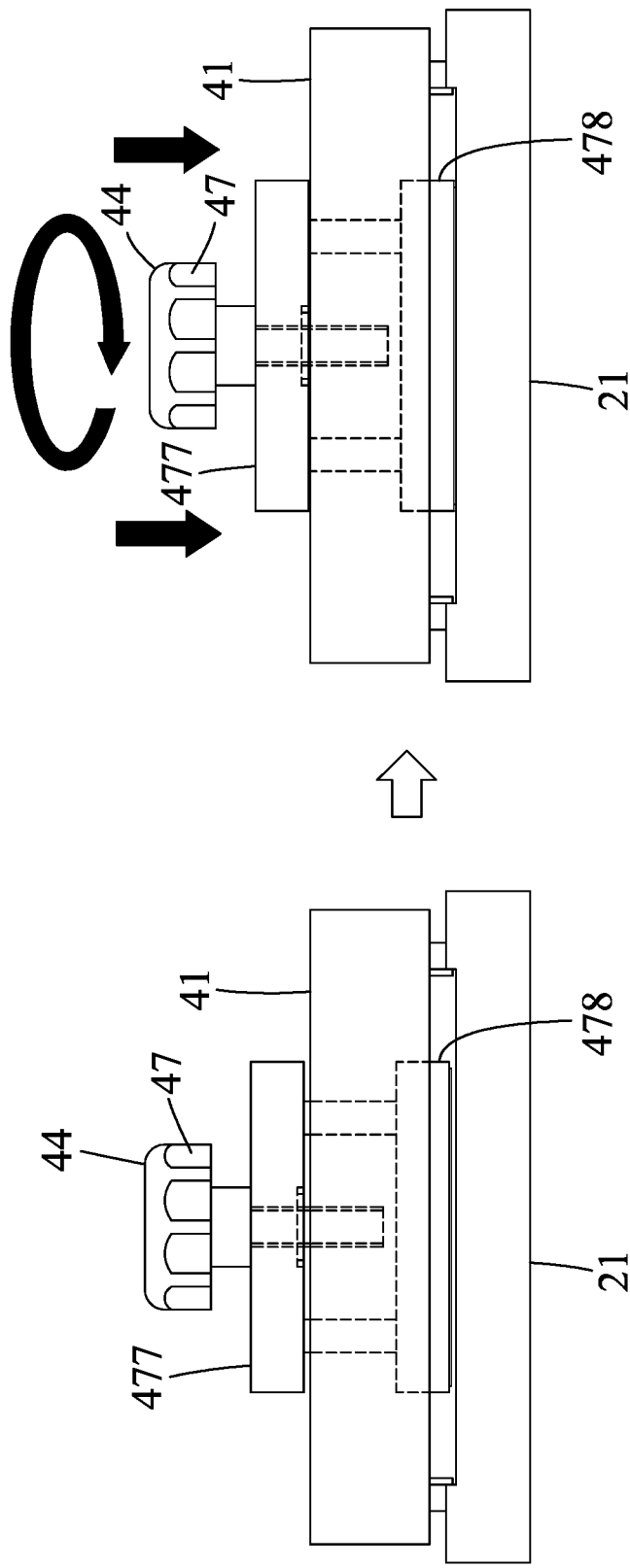

In some variant embodiments, as shown in FIG. 22, the lock mechanism 44 of each of the slide units 4 further has a top retaining block 477 and a bottom retaining block 478. The top retaining block 477 is disposed atop the slide seat 41. The bottom retaining block 478 is disposed under the top retaining block 477 in a spaced-apart manner, and is co-movably connected to the top retaining block 477 by rods. The locking member 47 rotatably and threadedly extends through the top retaining block 477, and is rotatably and threadedly connected to the slide seat 41. Rotation of the locking member 47 in one direction may drive the top retaining block 477 together with the locking member 47 and the bottom retaining block 478 to simultaneously move downwardly relative to the slide seat 41 in a manner that the bottom retaining block 478 abuts against the respective one of the base seats 21 so that the slide seat 41 is immovably positioned relative to the respective one of the base seats 21. Meanwhile, abutment of the top retaining block 477 against the top surface of the slide seat 41 may prevent excessive rotation of the locking member 47 from lifting the slide seat 41. To enhance the slide seat 41 to be immovably positioned relative to the respective one of the base seats 21, the bottom retaining block 478 may have a rubber at a bottom end thereof. The rotation of the locking member 47 in another direction may drive the bottom retaining block 478 to move away from the respective one of the base seats 21 so that the slide seat 41 may move relative to the respective one of the base seats 21.

Figure 23:
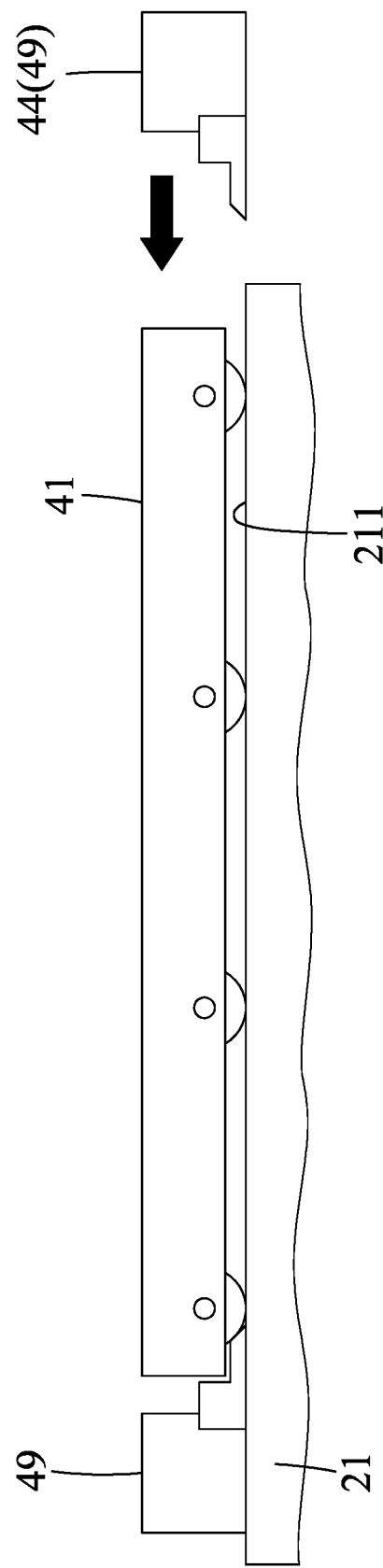

Referring to FIG. 23, in some embodiments, the lock mechanism 44 of each of the slide units 4 has two stopping members 49, each of which is inserted between a respective one of two opposite ends of the slide seat 41 and the respective one of the rails 211.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A low friction horizontal probing fixture adapted for cooperating with a probe unit to measure a test workpiece, said low friction horizontal probing fixture comprising:
    a base unit having two rails that are elongated in a first direction;
    two slide units respectively disposed on and slidable along said rails, each of said slide units having
        a slide seat that is disposed adjacent to a respective one of said rails,
        a plurality of rolling members that are rotatably connected to said slide seat and that are rollable on the respective one of said rails so that said slide seat is movable along the respective one of said rails, and
        a lock mechanism that is disposed on said slide seat and that is operable to position said slide seat relative to the respective one of said rails; and
    a carrier unit adapted to be mounted with the probe unit, and connected co-movably to said slide units, said carrier unit having a guiding member that is elongated in a second direction perpendicular to the first direction and that interconnects said slide units;
    wherein, for each of said slide units:
    said slide seat has
        a plurality of installation grooves that are elongated in the first direction and that are spaced part from each other in the second direction, and
        a plurality of through holes that are formed in said slide seat and that communicate said installation grooves with an external environment;
        said rolling members are installed in said installation grooves; and
        said slide unit further has a plurality of shafts that extend respectively through said through holes and respectively through said rolling members such that said rolling members are rotatable about said shafts.

2. The low friction horizontal probing fixture as claimed in claim 1, wherein said carrier unit further has a moving seat that is disposed on and movable along said guiding member, and that is adapted to be mounted with the probe unit.

3. The low friction horizontal probing fixture as claimed in claim 1, wherein:
    said carrier unit further has a plurality of magnetic blocks that are stacked on said slide seats of said slide units in a top-bottom direction perpendicular to the first direction and the second direction, said guiding member being elevated by said magnetic blocks; and
    said low friction horizontal probing fixture further comprises a plurality of lifting members that are adapted to lift the test workpiece, a top surface of the test workpiece being probed by a probe subunit of the probe unit that is mounted on said carrier unit, a bottom surface of the test workpiece being probed by another probe subunit of the probe unit that is disposed under the test workpiece.

4. The low friction horizontal probing fixture as claimed in claim 3, wherein:
    said slide seat of each of said slide units has a sliding body, said rolling members being rotatably connected to said sliding body, and
    four magnetic members, each being embedded in said sliding body and attracting a corresponding one of said magnetic blocks; and
    said magnetic members are spaced apart from each other in the first direction and the second direction in a manner that polarities of any two adjacent ones of said magnetic members are different.

5. The low friction horizontal probing fixture as claimed in claim 1, wherein:
    said base unit includes two base seats that are parallel to each other, that are spaced apart from each other in the second direction, and that respectively have said rails;
    each of said rails has a first rail portion and a second rail portion that are spaced apart from each other in the second direction; and
    for each of said slide units, said rolling members are mounted to two opposites sides of said slide seat in the second direction, and each of said rolling members is in rotating contact with a corresponding one of said first rail portion and said second rail portion of the respective one of said rails.

6. The low friction horizontal probing fixture as claimed in claim 5, wherein each of said rolling members has
a rolling body, and
at least one flange that extends outwardly from said rolling body and that abuts against the corresponding one of said first rail portion and said second rail portion of the respective one of said rails.

7. The low friction horizontal probing fixture as claimed in claim 1, wherein:
said base unit includes
two base seats that are parallel to each other, that are spaced apart from each other in in the second direction, and that respectively have said rails, and
two positioning members that are parallel to each other, that are spaced apart from each other in the first direction, and that interconnect said base seats;
each of said base seats further has a plurality of first engaging members disposed on two opposite ends thereof, and
each of said positioning members has
a positioning body that is elongated in the second direction, and
two coupling portions that extend respectively from two opposite ends of said positioning member, each of said coupling portions having two second engaging members that are engaged respectively with a corresponding pair of said first engaging members of a corresponding one of said base seats.

8. The low friction horizontal probing fixture as claimed in claim 7, wherein, for each of said positioning members:
each of said coupling portions has a grooved segment that is elongated in the second direction, that is engaged with a respective one of said base seats, and that has
an end surface being in contact with a top surface of the respective one of said base seats, and
a side surface extending perpendicularly from said end surface and facing a lateral surface of the respective one of said base seats; and
said second engaging members of said coupling portions are disposed on said end surfaces of said grooved segments of said coupling portions.

9. The low friction horizontal probing fixture as claimed in claim 1, wherein:
said base unit includes two base seats that are parallel to each other, that are spaced apart from each other in the second direction, and that respectively have said rails;
said lock mechanism of each of said slide units has a knob subunit,
two linkage bars that are connected to said knob subunit, each of said linkage bars having a first end that is formed with a locking hole, and a second end that is opposite to said first end, said locking holes of said linkage bars overlapping each other, said second ends of said linkage bars being disposed respectively at opposite sides of said knob subunit, and
two locking members that extend respectively from said second ends of said linkage bars and that are disposed respectively adjacent to opposite ends of a respective one of said base seats;
for each of said slide units, said knob subunit has an elliptical block that is rotatably disposed in said locking holes of said linkage bars, and that has a major axis and a minor axis; and
for each of said slide units, said elliptical block is rotatable relative to said slide seat between a releasing position, where said minor axis of said elliptical block is parallel to the second direction, and where said linkage bars are movable relative to each other such that said slide unit is movable relative to the respective one of said base seats, and a locking position, where a major axis of said elliptical block is parallel to the second direction, and where said linkage bars are driven by said elliptical block to move toward each other such that said locking members are moved to clamp the respective one of said base seats therebetween, and such that said slide seat is immovably positioned relative to the respective one of said base seats.

10. The low friction horizontal probing fixture as claimed in claim 9, wherein, for each of said slide units, said knob subunit further has:
a mounting table that is fixed to said slide seat and that has a plurality of positioning holes, said first ends of said linkage bars being mounted to said mounting table; and
a knob that is rotatably disposed on said mounting table and that has said elliptical block at a bottom end thereof, said knob further having a positing ball that is removably engaged with one of said positioning holes.

11. The low friction horizontal probing fixture as claimed in claim 9, wherein, for each of said slide units, said lock mechanism further has two resilient members, each of said resilient members being disposed between said slide seat and a respective one of said locking members for biasing the respective one of said locking members away from said slide seat when said elliptical block is rotated to the locking position.

12. The low friction horizontal probing fixture as claimed in claim 1, wherein:
said base unit includes two base seats that are parallel to each other, that are spaced apart from each other in the second direction, and that respectively have said rails; and
said lock mechanism of each of said slide units has at least one locking member for threadedly locking said slide seat to the respective one of said base seats.

13. The low friction horizontal probing fixture as claimed in claim 1, wherein said lock mechanism of each of said slide units has two stopping members, each of which is inserted between a respective one of two opposite ends of said slide seat and the respective one of said rails.

14. A low friction horizontal probing fixture adapted for cooperating with a probe unit to measure a test workpiece, said low friction horizontal probing fixture comprising:
a base unit having two rails that are elongated in a first direction;
two slide units respectively disposed on and slidable along said rails, each of said slide units having
a slide seat that is disposed adjacent to a respective one of said rails,
a plurality of rolling members that are rotatably connected to said slide seat and that are rollable on the respective one of said rails so that said slide seat is movable along the respective one of said rails, and
a lock mechanism that is disposed on said slide seat and that is operable to position said slide seat relative to the respective one of said rails; and
a carrier unit adapted to be mounted with the probe unit, and connected co-movably to said slide units, said carrier unit having a guiding member that is elongated in a second direction perpendicular to the first direction and that interconnects said slide units;

wherein:

said base unit includes two base seats that are parallel to each other, that are spaced apart from each other in the second direction, and that respectively have said rails;

each of said base seats further has
- a flat portion that has two ends opposite to each other in the first direction, and
- two halting portions that extend respectively and upwardly from said two ends of said flat portion in a top-bottom direction perpendicular to the first direction and the second direction, and that serve to halt movement of corresponding ones of said rolling members;

for each of said base seats, said rail has a first rail portion and a second rail portion that are respectively formed on two opposite sides of said flat portion in the second direction; and said rolling members of each of said slide units are rollable on said first rail portion and said second rail portion of the respective one of said rails.

15. The low friction horizontal probing fixture as claimed in claim 14, wherein said carrier unit further has a moving seat that is disposed on and movable along said guiding member, and that is adapted to be mounted with the probe unit.

16. The low friction horizontal probing fixture as claimed in claim 14, wherein:

said carrier unit further has a plurality of magnetic blocks that are stacked on said slide seats of said slide units in a top-bottom direction perpendicular to the first direction and the second direction, said guiding member being elevated by said magnetic blocks; and said low friction horizontal probing fixture further comprises a plurality of lifting members that are adapted to lift the test workpiece, a top surface of the test workpiece being probed by a probe subunit of the probe unit that is mounted on said carrier unit, a bottom surface of the test workpiece being probed by another probe subunit of the probe unit that is disposed under the test workpiece.

17. The low friction horizontal probing fixture as claimed in claim 14, wherein:

each of said rails has a first rail portion;

for each of said slide units, said slide seat has a recess portion that is recessed from a bottom side thereof in a top-bottom direction perpendicular to the first direction and the second direction, and that is aligned with said first rail portion of the respective one of said rails; and for each of said slide units, said rolling members are configured as rolling posts, are mounted in said recess portion in a spaced-apart manner, and are in rotating contact with said first rail portion of the respective one of said rails.

18. A low friction horizontal probing fixture adapted for cooperating with a probe unit to measure a test workpiece, said low friction horizontal probing fixture comprising:

a base unit having two rails that are elongated in a first direction;

two slide units respectively disposed on and slidable along said rails, each of said slide units having
- a slide seat that is disposed adjacent to a respective one of said rails,
- a plurality of rolling members that are rotatably connected to said slide seat and that are rollable on the respective one of said rails so that said slide seat is movable along the respective one of said rails, and
- a lock mechanism that is disposed on said slide seat and that is operable to position said slide seat relative to the respective one of said rails; and a carrier unit adapted to be mounted with the probe unit, and connected co-movably to said slide units, said carrier unit having a guiding member that is elongated in a second direction perpendicular to the first direction and that interconnects said slide units;

wherein:

said carrier unit further has a plurality of magnetic blocks that are stacked on top surfaces of said slide seats of said slide units in a top-bottom direction perpendicular to the first direction and the second direction, said guiding member being elevated by said magnetic blocks; and said magnetic blocks are movable along said top surfaces of said slide seats for alleviating resistive forces resulting from movement of said slide seats relative to said rails.

19. The low friction horizontal probing fixture as claimed in claim 18, wherein:

each of said rails has a first rail portion and a second rail portion that are spaced apart from each other in the second direction;

for each of said slide units, said slide seat has two recess portions that are recessed from a bottom side thereof in a top-bottom direction perpendicular to the first direction and the second direction, and that are respectively aligned with said first rail portion and said second rail portion of the respective one of said rails; and for each of said slide units, said rolling members are configured as rolling posts, are mounted in said recess portions in a spaced-apart manner, and are in rotating contact with said first rail portion and said second rail portion of the respective one of said rails.

20. The low friction horizontal probing fixture as claimed in claim 18, wherein:

each of said rails has a first rail portion;

for each of said slide units, said slide seat has a recess portion that is recessed from a bottom side thereof in a top-bottom direction perpendicular to the first direction and the second direction, and that is aligned with said first rail portion of the respective one of said rails; and for each of said slide units, said rolling members are configured as rolling posts, are mounted in said recess portion in a spaced-apart manner, and are in rotating contact with said first rail portion of the respective one of said rails.

* * * * *